(12) United States Patent
Lennon

(10) Patent No.: US 10,663,093 B2
(45) Date of Patent: May 26, 2020

(54) PIPE FITTING WITH SENSOR

(71) Applicant: LenLok Holdings, LLC, Willoughby, OH (US)

(72) Inventor: William H. Lennon, Hunting Valley, OH (US)

(73) Assignee: LENLOCK HOLDINGS, LLC, Willoughby, OH (US)

(*) Notice: Subject to any disclaimer, the term of this patent is extended or adjusted under 35 U.S.C. 154(b) by 562 days.

(21) Appl. No.: 15/274,169

(22) Filed: Sep. 23, 2016

(65) Prior Publication Data

US 2017/0089496 A1    Mar. 30, 2017

Related U.S. Application Data

(60) Provisional application No. 62/232,017, filed on Sep. 24, 2015, provisional application No. 62/251,853, filed on Nov. 6, 2015.

(51) Int. Cl.
*F16L 13/14* (2006.01)
*G01M 5/00* (2006.01)

(52) U.S. Cl.
CPC ......... *F16L 13/146* (2013.01); *G01M 5/0025* (2013.01); *G01M 5/0033* (2013.01);
(Continued)

(58) Field of Classification Search
CPC . F16L 13/146; F16L 2201/10; F16L 2201/20; F16L 2201/30; G01M 5/0025; G01M 5/0033; G01M 5/0083
(Continued)

(56) References Cited

U.S. PATENT DOCUMENTS 5,110,163 A    5/1992    Benson et al.
5,305,510 A    4/1994    Croft et al.
(Continued)

FOREIGN PATENT DOCUMENTS

EP    2851649 A1    4/2013
EP    2 921 242 A1    9/2015
(Continued)

OTHER PUBLICATIONS

Maxwell, et al.; "GMC 2013: Piping Misalignment and Vibration Related Fatigue Failures;" www.BetaMachinery.com; Dated Nov. 1, 2013; pp. 1-10.
(Continued)

*Primary Examiner* — Zachary T Dragicevich
*Assistant Examiner* — William S. Choi
(74) *Attorney, Agent, or Firm* — Pearne & Gordon LLP

(57) ABSTRACT

A fluid fitting is provided that is mechanically attached to a pipe, including a coupling body having an inner surface defining a bore for receiving the pipe therein. A ring is positioned to fit over the at least one end of the coupling body for mechanically attaching the coupling body to the pipe, and a main seal formed on the inner surface of the coupling body to engage the pipe. When installed, the ring and coupling body apply a compressive force to the main seal sufficient to attach the pipe to the coupling body in a non-leaking manner. An electrically operated sensor device is fixed to a surface of one of the coupling body or ring that, when the ring is installed on the coupling body, produces an electrical parameter in response to physical movement of the coupling body or ring to which the sensor device is fixed.

19 Claims, 4 Drawing Sheets

(52) U.S. Cl.
CPC ....... *G01M 5/0083* (2013.01); *F16L 2201/10* (2013.01); *Y10T 29/49908* (2015.01)

(58) Field of Classification Search
USPC ................................................ 285/93, 382.7
See application file for complete search history.

(56) References Cited

U.S. PATENT DOCUMENTS

| | | |
|---|---|---|
| 5,709,418 A | 1/1998 | Benson et al. |
| 6,131,964 A | 10/2000 | Sareshwala |
| 6,607,136 B1 | 8/2003 | Atsmon et al. |
| 6,692,040 B1 | 2/2004 | McKay et al. |
| 6,834,556 B2 | 12/2004 | Cain et al. |
| 7,090,030 B2 | 8/2006 | Miller |
| 7,158,034 B2 | 1/2007 | Corbett, Jr. |
| 7,575,257 B2 | 8/2009 | McKay |
| 7,616,119 B2 | 11/2009 | Corbett, Jr. |
| 8,004,414 B2 | 8/2011 | Angell et al. |
| 8,393,646 B2 | 3/2013 | Galle et al. |
| 8,439,404 B2 | 5/2013 | Anton et al. |
| D712,769 S | 9/2014 | Betsinger |
| 8,870,237 B2 | 10/2014 | Sindelar |
| 9,010,810 B2 | 4/2015 | Anton et al. |
| 9,378,448 B2 | 6/2016 | Ching et al. |
| 9,400,070 B2 | 7/2016 | Anton et al. |
| 2006/0186666 A1 | 8/2006 | McKay |
| 2006/0202821 A1 | 9/2006 | Cohen |
| 2006/0250245 A1 | 11/2006 | Forster |
| 2007/0276201 A1 | 11/2007 | Lee et al. |
| 2008/0252459 A1 | 10/2008 | Butler et al. |
| 2011/0133759 A1* | 6/2011 | Chamberlin ........ F16L 37/0985 324/682 |
| 2011/0163536 A1 | 7/2011 | Sindelar |
| 2011/0181399 A1 | 7/2011 | Pollack et al. |
| 2011/0287713 A1 | 11/2011 | Ali et al. |
| 2012/0007607 A1* | 1/2012 | Lowe .................. G01M 5/0083 324/639 |
| 2012/0126008 A1 | 5/2012 | Binmore |
| 2013/0056538 A1 | 3/2013 | Binmore |
| 2014/0000386 A1 | 1/2014 | Malhan et al. |
| 2014/0360279 A1 | 12/2014 | Jenkins |
| 2015/0054621 A1 | 2/2015 | Lin et al. |
| 2015/0083810 A1 | 3/2015 | Ching et al. |
| 2015/0139715 A1 | 5/2015 | Exner et al. |
| 2015/0252922 A1 | 9/2015 | Anton et al. |

FOREIGN PATENT DOCUMENTS

| | | |
|---|---|---|
| JP | 2003-302332 A | 10/2003 |
| RU | 2 269 055 C2 | 1/2006 |
| WO | 02/25161 A1 | 3/2002 |
| WO | 2008/005547 A2 | 1/2008 |
| WO | 2009/122166 A2 | 10/2009 |
| WO | 2013/116087 A1 | 8/2013 |
| WO | 2013/168720 A1 | 11/2013 |
| WO | 2015/099763 A1 | 7/2015 |

OTHER PUBLICATIONS

Swedberg; "Campbell Uses RFID Sensor Tags to Test Cooking Equipment" RFID Journal; Dated Jun. 5, 2015; pp. 1-2.
Corresponding U.S. Appl. No. 15/168,426, filed May 31, 2016.
International Search Report and Written Opinion from Corresponding Application No. PCT/US2016/053324; dated Dec. 22, 2016.
Extended European Search Report dated Aug. 21, 2019 for corresponding European Application No. 16849693.3.

* cited by examiner

PIPE FITTING WITH SENSOR

CROSS-REFERENCE TO RELATED APPLICATIONS

This application claims the benefit of U.S. Provisional Application No. 62/251,853, filed Nov. 6, 2015 and U.S. Provisional Application No. 62/232,017, filed Sep. 24, 2015, the entire disclosures of which are hereby incorporated herein by reference.

FIELD OF THE INVENTION

The present invention relates generally to a fluid fitting for mechanically attaching and sealing a pipe, and more particularly, to a wireless sensor attached to the fluid fitting and method of use.

BACKGROUND OF THE INVENTION

Generally, one type of fitting for fluid conduits, such as tubes or pipes, includes a connector body that fits loosely over the fluid conduit and a drive ring which compresses and/or physically deforms the connector body against the outside surface of the fluid conduit to provide one or more seals and to provide a strong mechanical connection.

Conventionally, various physical inspection tests have been developed to confirm a proper installation of the fluid fitting upon the pipe. For example, various visual tests are used to ensure that the fitting is properly aligned and positioned upon the pipe. Other invasive or non-invasive tests can be done, such as ultrasonic tests, X-rays, or the like. However, these types of tests are typically only useful at the actual time of installation, and may only provide indirect evidence that the fitting is properly installed upon the pipe.

Moreover, these tests in particular do not offer continuing information about the state of the fitting over its useful lifetime. Often, these fluid fittings are used in harsh and sour environments in the presence of corrosive process fluids or gases, such as Hydrogen Sulfide. For example, $H_2S$ in the presence of water can result in damage to carbon steel pipelines in the form of corrosion, cracking, or blistering. The effects of $H_2S$ on steel can result in sulphide stress cracking (SSC), hydrogen induced cracking (HIC), and corrosion. The presence of carbon dioxide in the sour environment tends to increase the corrosion rate in the steel. It may also increase the susceptibility of the steel to both SSC and HIC. These effects can jeopardize the fluid fitting and pipe.

It would be beneficial to provide a sensor and method of use that can provide information about the state of the fluid fitting at the time of installation upon the pipe, as well as continuing information over the useful lifetime of the fitting.

BRIEF SUMMARY OF THE INVENTION

The following presents a simplified summary of example embodiments of the invention. This summary is not intended to identify critical elements or to delineate the scope of the invention.

In accordance with one aspect, a fluid fitting is provided that is mechanically attached to a pipe, comprising a coupling body having an inner surface defining a bore for receiving the pipe therein at at least one end thereof. A ring is positioned to fit over the at least one end of the coupling body for mechanically attaching said coupling body to the pipe, and a main seal formed on the inner surface of the coupling body to engage the pipe. When said ring is installed on the at least one end of the coupling body via force, the ring and coupling body apply a compressive force to the main seal sufficient to cause elastic deformation of the ring and permanent deformation of the coupling body and pipe to thereby attach the pipe to the coupling body in a non-leaking manner. An electrically operated sensor device is fixed to a surface of one of the coupling body or ring that, when said ring is installed on said coupling body, produces an electrical parameter in response to physical movement of said coupling body or ring to which the sensor device is fixed.

In accordance with another aspect, a method of mechanically attaching a fluid fitting to a pipe comprises the steps of inserting a pipe into one end of the fluid fitting, whereby a main seal formed on an interior of the fluid fitting is positioned adjacent an exterior surface of the pipe. The method further comprises the step of attaching a wireless electrically operated sensor device comprising a strain gauge to a surface of the fluid fitting, wherein the strain gauge produces an electrical parameter in response to physical movement of the fluid fitting. The method further comprises the step of applying a compressive force to the fluid fitting sufficient to cause permanent deformation of the main seal against the exterior surface of the pipe to thereby permanently attach the fluid fitting to the pipe in a non-leaking manner. The method further comprises the steps of interrogating, using an RF interrogator, the wireless electrically operated sensor device, and in response to said interrogating, transmitting, from the electrically operated sensor device, said electrical parameter that was produced in response to physical movement of fluid fitting after being permanently attached to the pipe.

It is to be understood that both the foregoing general description and the following detailed description present example and explanatory embodiments. The accompanying drawings are included to provide a further understanding of the described embodiments and are incorporated into and constitute a part of this specification. The drawings illustrate various example embodiments of the invention.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
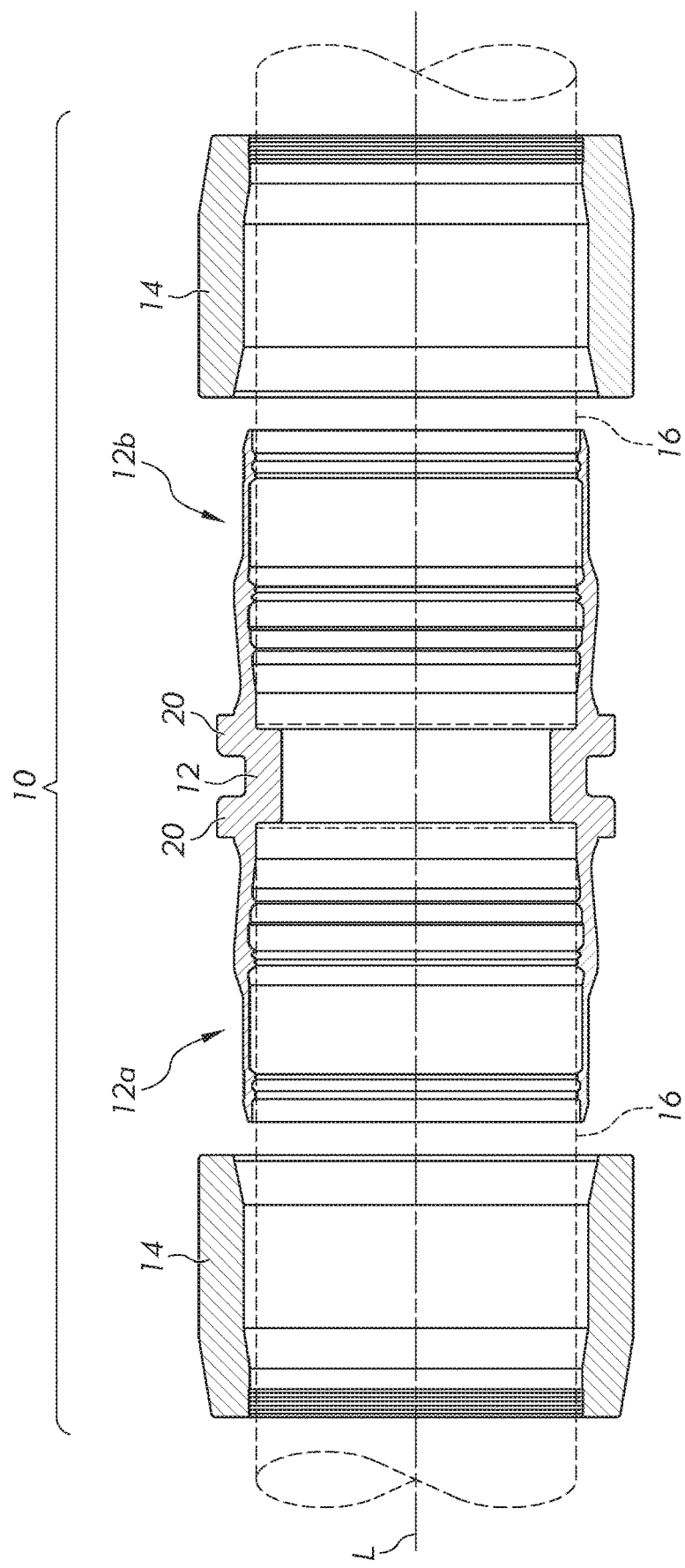
FIG. 1 schematically illustrates a sectional view of an example fluid fitting.

Example embodiments are described and illustrated in the drawings. These illustrated examples are not intended to be a limitation on the present invention. For example, one or more aspects can be utilized in other embodiments and even other types of devices. Moreover, certain terminology is used herein for convenience only and is not to be taken as a limitation. Still further, in the drawings, the same reference numerals are employed for designating the same elements.

Turning to the shown example of FIG. 1, the example fitting 10 may be utilized to connect either thin walled or thick walled pipes, such as those ranging in size from ¼" NPS to 4" NPS, although other pipe sizes may also derive a benefit from the example fitting 10. The example fitting 10 includes predetermined ratios of interference between a drive ring 14 (sometimes referred to as a "swage ring"), body 12, and pipe 16 along the length of a cylindrical contact area. The example fitting 10 may be installed on pipes 16. The coupling body 12 and the drive ring 14 together are utilized to join a pipe body 16 to the fitting 10. The components are generally symmetrical about a central axis or the longitudinal axis L. The example shown is a fitting 10 having two opposed ends with each end being configured to accept a pipe body 16 therein. Correspondingly, the example shown has two drive rings 14, although it is understood that the fitting may be configured to receive only one pipe via one end. Various example fittings are shown in commonly owned U.S. Pat. Nos. 8,870,237; 7,575,257; 6,692,040; 6,131,964; 5,709,418; 5,305,510; and 5,110,163, which are all expressly incorporated herein by reference in their entirety.

Figure 2:
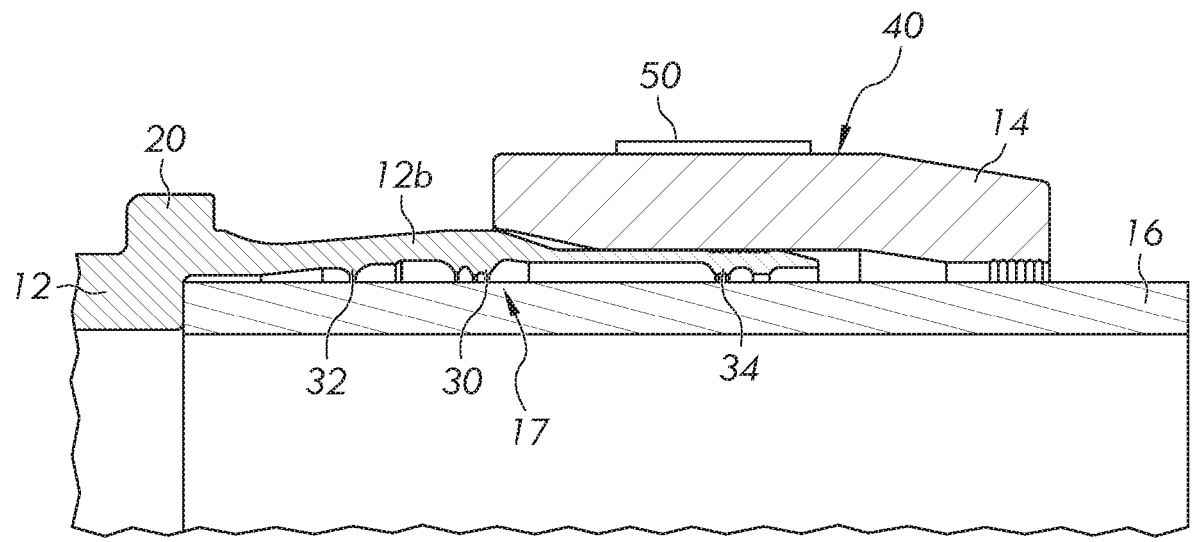
FIG. 2 schematically illustrates a sectional view of one end of the example fitting of FIG. 1, showing the ring partially installed on the end of the body with a pipe positioned inside the body.

Referring to FIG. 2, the drive ring 14 is shown partially installed or preassembled on the sleeve 12b of the coupling body 12 in a pre-installed position. In this position, the drive ring ramped up section is adjacent, but slightly spaced relative to, the main seal land section. Through an interference fit, the drive ring 14 is maintained and can be shipped to customers in the pre-installed position on the coupling body 12, which facilitates ease of use and installation by the ultimate end-users.

Broadly speaking, installation of the fitting 10 upon a pipe or tube causes permanent, irreversible deformation to the pipe or tube that it is coupled to, providing a metal-to-metal seal between the pipe/tube and the fitting body. The fitting may include one or more seals, such as any of a main seal 30, inboard seal 32, outboard seal 34, etc. When the drive rings 14 are axially forced onto the respective sleeves 12a, 12b with the pipe sections 16 received therein, the sleeves 12a, 12b become mechanically connected to and sealed with the tube or pipe sections. The swage or drive ring 14 is sized to be annularly received over and axially forced along the sleeve 12a for forcing the seals 30, 32, 34 to bite into the pipe 16 to seal and mechanically connect the body 12 with the pipe 16.

Setting of a seal means the tooth or teeth of the seal(s) are swaged or forced into deforming contact with the pipe 16. The axial movement of the drive ring over the coupling body 12, via an interference fit, applies a compressive force that swages the body onto the pipe or tube surface, compressing the pipe/tube wall, first elastically (i.e., non-permanent) and then plastically (i.e., permanent). These contact stresses are sufficiently high to plastically yield the pipe/tube surface under the sealing lands, forming a 360° circumferential, permanent, metal-to-metal seal between the pipe/tube and the coupling body 12.

Setting of a seal is considered complete (i.e., fully set) when the seal's tooth or teeth are completely forced into deforming contact with the pipe 16 (e.g., when the exterior surface 17 of the pipe 16 immediately opposite the seals 30, 32, 34 has no further radial movement as a result of being forced inward by a particular section of the drive ring 14). Alternatively, full setting of a seal(s) can be defined as when the drive ring 14 has forced the tooth or teeth of the seal furthest into the pipe 16 or when an actuating taper of the drive ring 14 levels out to a diametrically constant cylindrical section as the drive ring 14 moves past the seal. The pipe 16 typically becomes stressed beyond its elastic limit as the seals 30, 32, 34 continue to bite into the surface and the pipe 16 begins to plastically deform or move radially inwardly resulting in permanent deformation. The teeth of the seals 30, 32, 34 bite into and deform the exterior surface 17 of the pipe 16 and may themselves be somewhat deformed. This functions to fill any rough or irregular surface imperfections found on the outside of the pipe 16.

Figure 3:
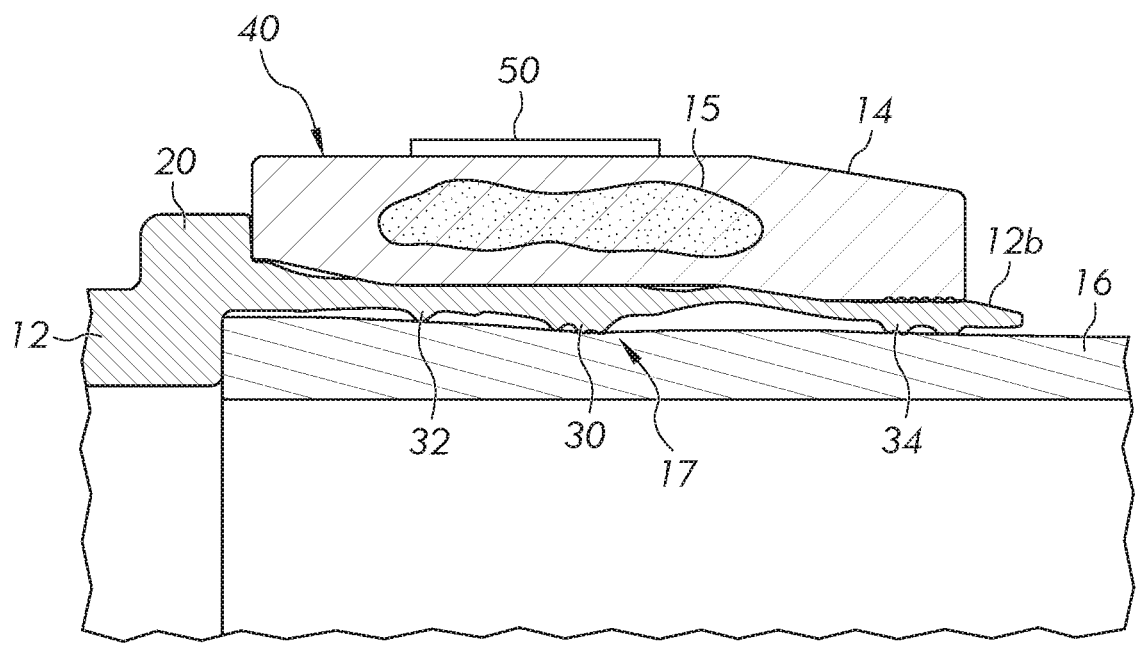
FIG. 3 is a cross-sectional view similar to FIG. 6, but showing the ring in a fully installed position on the end of the body and the associated deformation of the sleeve and pipe.

Referring to FIG. 3, to fully install the drive ring 14 onto the sleeve 12b with the pipe 16 inserted therein for purposes of mechanically connecting and sealing the fitting 10 to the pipe 16, an installation tool (not shown) can be used to further force the drive ring 14 onto the sleeve 12b toward the tool engaging flange 20. Axial movement of the drive ring 14 onto the coupling body 12 with the pipe 16 inserted therein causes radial movement of the body 12, and particularly the seals of the body 12, toward or into the pipe 16 to create seals and mechanical connections therewith. In addition, the pipe 16 deforms and the coupling body 12 deforms. As can be seen between a comparison of FIGS. 2-3, overlap areas between the body 12 and the ring 14 require some type of deformation or biting. In order for the ring to move past the body in this overlap area, either the seal teeth must bite into the pipe 16, the pipe 16 must deform, and/or the ring 14 and/or body 12 must deform.

The drive ring 14 is forced axially on the body sleeve 12a to the final installed position. In this position, the drive ring 14 abuts or engages the body flange 20. Alternatively, the drive ring 14 could be positioned closely adjacent the flange 20 without contact therewith. Simultaneous with the radial movement of the body 12 and the deformation of the pipe 16, radial movement of the drive ring 14 occurs outwardly. This radial deformation of the drive ring 14 is typically elastic, and results in a small increase in the diameter of the drive ring 14.

The internal dimension of the drive ring 14 is such that when the ring is forced on the sleeve, the sleeve is compressed radially a sufficient distance not only to press the sleeve against the tubing, but to compress the sleeve sufficiently that the pipe underlying the sleeve is also compressed radially. The stress within the drive ring need never exceed the elastic limit of the material forming the drive ring. The radial expansion which occurs is well within the elastic limits of the material with the result that an elastic force is maintained against the sleeve and the pipe. Indeed, due to the metallurgical nature of the metal connection via a swaging action, there is a significant change in the physical properties of the drive ring to be clearly measured by a suitable sensor. Preferably, an electrically operated sensor is used that produces an electrical parameter, which includes an electrically detectable parameter, in response to physical movement of the device to which the sensor device is fixed.

For example, as the drive ring is pushed onto the interfitting pipe, the drive ring can encounter a working stress of about 20,000 psi and elastically deforms and expands by about 1.5 mil (1 mil equals 1 thousandth inch). With most suitable materials, plastic deformation is measurable but minimal, and there is an elastic balance between the pipe, sleeve and drive ring which tends to increase the reliability of the coupling. In some examples, the electrical parameter of the sensor device can be produced in response to the elastic deformation of the drive ring, or even in response to the plastic deformation of the body 12 or pipe 16.

The physical stress 15 in the material of the drive ring 14, due to its elastic expansion during installation, is indicated by strain which can be measured by a sensor. As discussed above, this detectable strain is directly related to the stress/strain resulting from the deformation of the body 12 and/or pipe 16. Generally, a strain gauge measures the change in distance between two active spots, and so can be used to detect the changes in the drive ring or coupling body that result from installation of the fluid fitting upon the pipe. Depending upon the strain sensor used, and the orientation of its strain sensing element, the detected physical stress of the drive ring can be any of circumferential stress or hoop stress, axial stress, or radial stress. It is further contemplated that combinations of these can be detected. One common measurement technique is through the use of a sensor comprising a single-axis or multi-axis strain gauge. A strain gauge, sometimes referred to as a strain transducer, for metallic structures is typically a metal film resistance device. In one example, a strain transducer can be attached to a metal diaphragm that bends (strains) as a result of applied stress (resulting from material expansion or contraction) in the object being measured. These transducers typically produce a small electrical resistance change in response to the movement (strain) of the structure to which they are attached, which is often metal. Still, the strain sensor could indicate sensed strain by a change in impedance, conductivity or other detectable characteristic or condition. Various other types of strain sensors could be used, including semiconductor strain gauges (sometimes called piezoresistors), capacitive strain gauges, etc. It is to be appreciated that the electrical parameter, or electrically detectable parameter, will correspond to that produced by or associated with the particular type of sensor device used.

Conventionally, such strain gauges are connected to an electronic reader device by physical wires or the like. However, for ease of use, installation, and reliability, it would be greatly beneficial to utilize a non-contact, wireless strain gauge. Various non-contact, wireless implementations of a strain gauge can be utilized, such as an RFID system. One such wireless strain gauge that may be used is described in commonly owned U.S. Pat. No. 9,378,448 ("the '448 patent"), which is expressly incorporated herein by reference in its entirety. It is to be appreciated that single or multi-element strain gauges can be used. A single element strain gauge can be used with the strain transducer aligned along the desired axis to be sensed. Alternatively, a multi-element strain gauge can be 2 or 4 gauges located 180 or 90 degrees from each other to minimize bending cross talk and improve accuracy.

In general, RFID tags include a microchip or integrated circuit used to sense, transmit and/or store information. An external transceiver/interrogator/reader 100 (e.g., a RFID reader) located in close proximity or remotely with respect to the RFID tag is used to wirelessly receive information from and/or transmit information to the RFID tag. The RFID tag typically includes an antenna that transmits RF signals relating to the identification and/or information stored within the RFID tag. It should be appreciated that multiple RFID tags may be utilized, to be read by the interrogator. For example, utilizing multiple RFID tags may be beneficial to provide a number of angles from which the interrogator may interrogate the RFID tags, for taking multiple readings at different positions on the object to be sensed, and/or may provide redundancy in the event that one or more of the RFID tags is damaged. The interrogator 100 is also used to provide power to the RFID tag, in whole or in part, whereby the wireless communication transceiver of the RFID is passively powered by an electromagnetic field from the interrogator. That is, the circuitry of the RFID tag is powered by the electromagnetic energy transmitted from the interrogator 100.

The interrogator 100 is generally configured to probe or interrogate the RFID tag, and typically includes a transmitter and receiver for exchanging RFID information with the RFID tag. In response to such interrogating, the RFID tag will typically transmit return information to the interrogator. It is further contemplated that two-way communication may occur, in which the interrogation of the RFID tag may transmit information from the interrogator to be received by, stored by, or acted upon by the RFID tag; conversely, the RFID tag may transmit return information back to the interrogator. The interrogator may also include a processor for receiving the RF data from the RFID tag and extrapolating the RF data into meaningful data whereby identification or other fixed or stored information can be perceived by a user. In certain embodiments, the interrogator may be integrated with a computer system. The interrogator preferably has on-board non-transient computer memory to store the received data for later retrieval, analysis, or transmission. Additionally, the interrogator preferably is capable of communication on a local network (LAN) or wide-area network (WAN), including the internet and world-wide web. Preferably, the interrogator itself is capable of wireless data communication, such as via Wifi, Bluetooth, NFC, cellular (analog or digital, including all past or present iterations), or other similar techniques. Further, the interrogator preferably has a programmable microprocessor that can include various features and capabilities. For example, the microprocessor includes a programmable computing core that is capable of any or all of processing commands, making calculations, tracking/reading data, storing data, analyzing data, adjusting/manipulating data, receiving new commands or instructions, etc.

Figure 4:
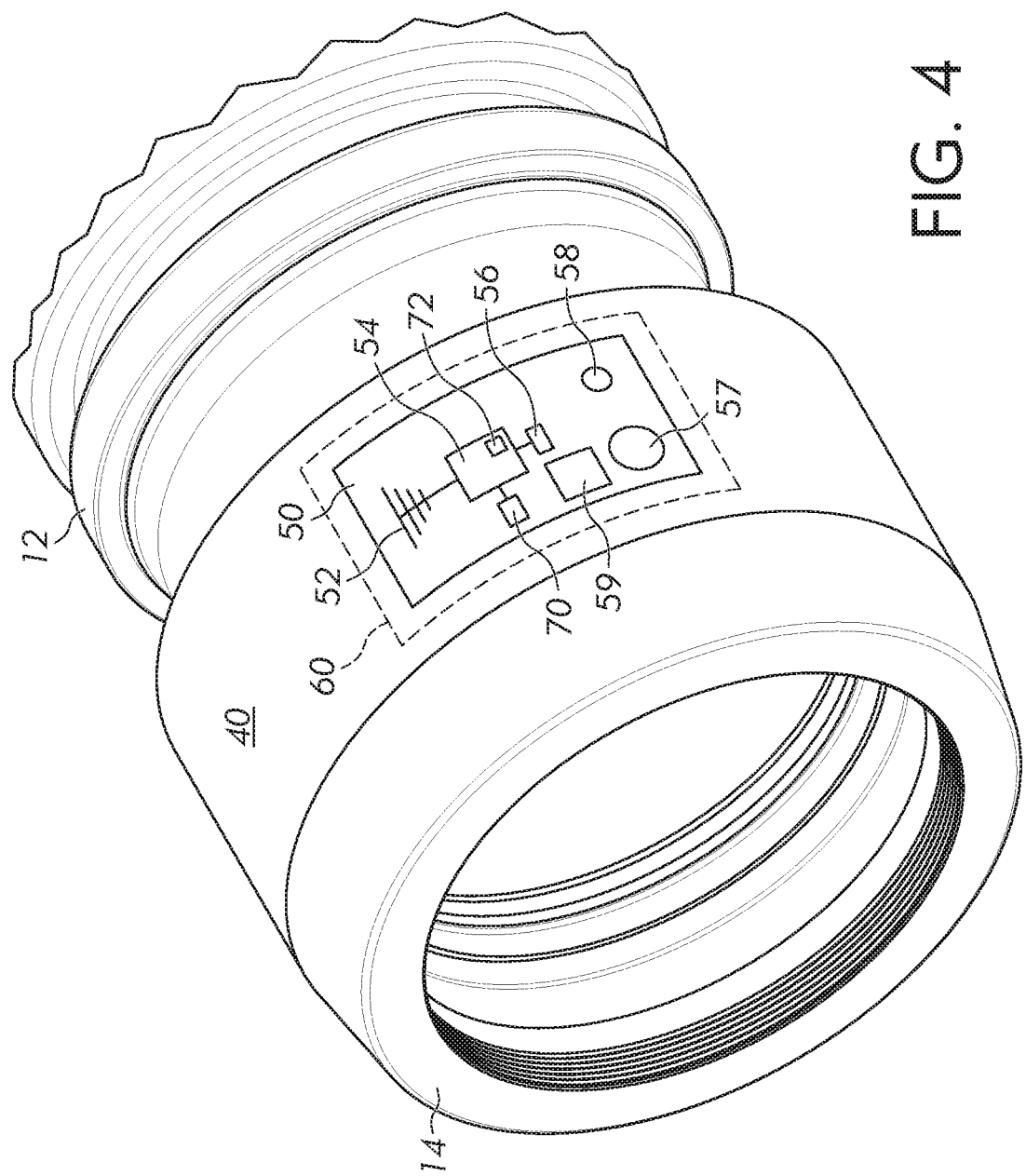
FIG. 4 schematically illustrates a partial perspective view of an example ring with a sensor attached thereto.

Turning to FIG. 4, one embodiment of a wireless electrically operated sensor device is illustrated in which the sensor device 50 is applied to the exterior surface 40 of the drive ring 14. As will be described herein, the sensor device 50 can be used to identify any or all of properties, status, and condition of the fluid fitting 10, as well as a quality of the attachment between the fluid fitting and the pipe. The use of the sensor device 50 is especially useful during an installation procedure of the fluid fitting 10 upon a pipe 16 to indicate that the seal is complete (i.e., fully set) and that an acceptable pull-up has occurred. In this manner, the use of the sensor device 50 to obtain real-time data may reduce or remove the need for post-installation inspections.

It is contemplated that the sensor device 50 can be affixed to various parts of the fitting 10, interior or exterior, including the body 12 and drive ring 14. The sensor device 50 could also be coupled to the pipe 16, either internally or externally, and could potentially be exposed to the fluid carried by the pipe. It is contemplated that the sensor device 50 could be located variously upon the pipe, although a location relatively closer to the installed fitting 10 (such as directly adjacent) is preferable. Stress or stain loading in the pipe, which may be caused by the weight of fluid carried within the pipe, or the installation load of the pipe depending upon how the pipe is installed or the structural loads applied to it, may be readily represented by detectable strain in the pipe. Such a sensor device located next to the fitting 10 can be used to understand or extrapolate the amount of stress or strain being realized by the fitting 10 by the pipe loading, which can help to indicate the condition or expected/forecasted condition of the seal integrity maintained by the installed fitting 10. In one example, at least one exterior surface of the sensor device 50 has a flexible single sided adhesive for attaching the sensor device 50 to the exterior of the drive ring. Alternatively, an externally-applied adhesive or the like can be used. Due to the swaging action at installation, the sensor device 50 may not be installed on the interior of the drive ring or the exterior of the body at locations where these two surfaces interfere, because the sensor device would likely be crushed, impacted, sheared, etc. Still, it may be possible to locate the sensor device at non-interfering locations, or even at an interfering location if the sensor is placed in a pocket, recess, or other protected location. In a first embodiment, the sensor device 50 can have a flexible construction that conforms to the shape of the tool or object to which it is attached (e.g., a drive ring, coupling body, or even pipe). It is desirable that the flexible sensor device 50 be configured for adhesion to curved and/or variable surfaces, such as the outer cylindrical periphery of the drive ring, interior of the body 12 or even pipe 16. It is contemplated that the flexible sensor device 50, including a flexible substrate, flexible circuit/traces, and optional flexible battery, can be stretched, wrinkled, bent, or flexed without degradation thereof. The flexible, wireless RFID sensor device 50 can be an RFID tag that includes a flexible substrate with a flexible circuit (printed or etched or laminated), an antenna 52, an integrated circuit 54 with capability to interface with wireless communication protocols (e.g., RFID, Bluetooth, NFC, RFID or other) using an on-board or separate communications chip, and capability to interface with an onboard sensor 56 (or even separate sensor) to obtain strain readings and store these readings and time-associated data of the reading in onboard non-transient memory. Various examples of memory for storing the information can be an erasable, programmable, read-only memory (EPROM), hard coded non-volatile internal memory, or various other read/write memory systems. Additional sensors may also be included, such as temperature sensors, environmental sensors (pressure, humidity, light, etc.), accelerometers, vibration, etc. In one example, the RFID strain gauge of the '448 patent can be configured as a flexible circuit, including some or all of the above-noted elements. The sensor device 50 could include still more features, such as switch 57 and/or a feedback device 58 (lights, displays, or speakers, etc.).

As noted herein, the fluid fittings of the instant application are often used in industrial settings, and may be subject to harsh, hazardous, and sour environments. The mechanical and environmental impact experienced by piping equipment during installation, storage, and field application may damage external RFID tags rendering the external tags inoperable. That is, tags may be crushed or disengaged from equipment during handling, installation, etc. and/or may degrade over time due to exposure to harsh environments.

Thus, it is preferred that after the RFID sensor device 50 is attached to the drive ring 14, body 12, or other object, a protective casing material 60 is applied over the RFID tag to encase and isolate the sensor device from the external environment. For example, the protective casing material 60 is applied over the RFID tag upon the exterior surface 40 of the drive ring 14 or other object. The protective casing material 60 is selected to be easily applied to the drive ring 14 and provide a thin coating that protects the underlying RFID sensor device 50 from mechanical and environmental damage. Preferably, the protective casing material 60 does not significantly increase the radial thickness of the pipe. In various examples, the RFID sensor device 50 and protective casing material 60 may be selected for usage in high temperature and/or high pressure environments and may advantageously provide readability, easy installation, and packaging that is resistant to mechanical and chemical stresses, even in harsh conditions. The casing material 60 is preferably also resistant to the stress/strain that occurs during installation of the fitting 10 upon the pipe. Where the sensor device 50 is attached to the pipe 16 and exposed to the fluid therein, it is also preferably that the protective casing material 60 seals the sensor device 50 from the fluid to inhibit contact therebetween.

The protective casing material 60 can be brushed, rolled or sprayed onto the flexible sensor device 50 and the drive ring 14, although any suitable means for disposing a relatively uniform thin layer of the protective casing material 60 may be utilized. In one embodiment, the protective casing material 60 can be a urethane coating, although other materials may also be suitable such as nitrile, Viton, epoxy, etc. In other embodiments, the protective casing material 60 could be a flexible plastic substrate or the like with a pressure sensitive adhesive that is placed over the sensor device 50 in a covering manner. Of course, the protective casing material 60 should be radio-transparent to the RF signal to enable the usage of an RFID communication system. It may be advantageous to taper the deposition of the protective casing material 60 such that it is thickest about the circumference of the drive ring 14 directly covering the RFID sensor device 50 and tapers out at the ends of the band of application to be relatively thinner.

Figure 5:
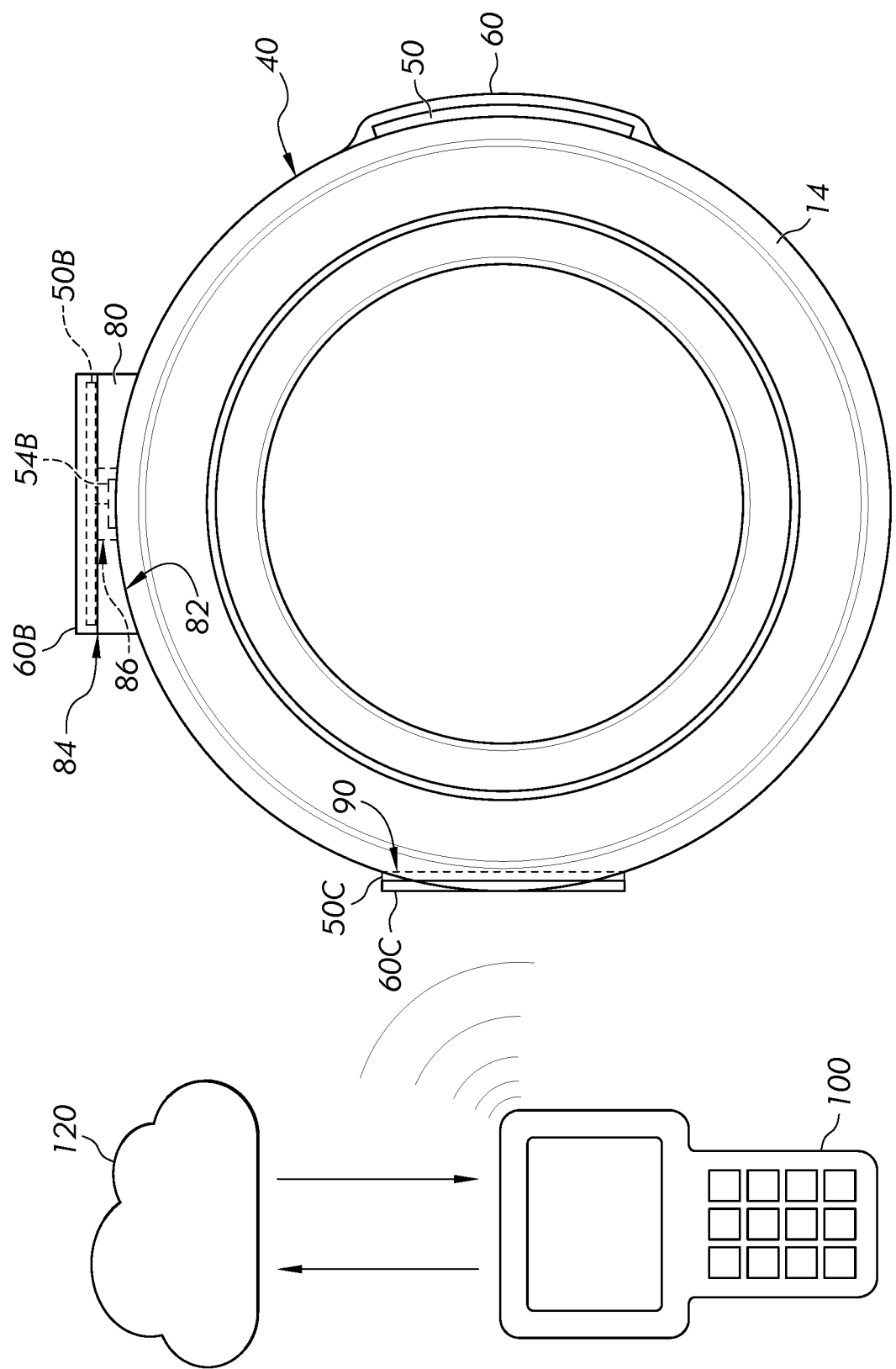
FIG. 5 is a front view of an example fluid fitting with various example sensors attached thereto.

As discussed above, the wireless strain gauge could be constructed in a flexible manner to be applied to an exterior surface of the fitting. However, it is also contemplated that the wireless RFID sensor could also be embodied in a partially flexible or even non-flexible circuit that is indirectly attached to the coupling body, drive ring, and/or pipe via an intermediary. For example, as shown schematically in FIG. 5, a sensor carrier 80 can be interposed between the sensor device 50 (or protective casing material 60) and the element to be sensed. It is understood that the representation in FIG. 5 is only one example, and may even be considered an exaggerated representation in some installation examples. The sensor carrier 80 can conform to, and be attached directly to, an exterior or interior surface of the coupling body, drive ring, and/or pipe. The sensor carrier 80 can include a fixation side 82 having a curvature or other geometry that corresponds to the exterior or interior periphery of the coupling body, drive ring, and/or pipe, and an opposite sensor side 84 that the sensor device 50B attaches to. The fixation side 82 of the sensor carrier 80 is preferably rigidly attached to the exterior or interior of the coupling body, drive ring, and/or pipe so that the strain sensor readings will be directly experienced by the sensor device 50B. Optionally, the sensor carrier 80 could include a through hole 86, recess, or other opening to provide direct access to the surface of the object to be sensed so that the strain gauge sensor 56 can be directly attached to the outer surface. For example, as shown schematically in FIG. 5, the strain gauge 54B can be directly attached to the exterior surface 40 of the ring 14 via the hole 86 while a majority of the sensor device 50B is supported by the sensor carrier 80. The strain gauge 54B can be located directly on the circuit substrate of the sensor device 50, or may be separated by a suitable electrically conductive lead. Where the sensor device 50 is rigid, or only partially flexible, the sensor device 50 can be attached to the ring 14 in a tangential manner so that the strain gauge sensor 56 is in contact with the exterior surface 40, and the sensor carrier 80 can act as a spacer to support the balance of the sensor device 50 above the curved exterior surface 40. With regards to a tangential installation of the sensor device 50, the depiction in FIG. 5 is schematic and may be considered exaggerated. For example, with a tangential installation, the sensor carrier 80 may be thinner than shown so that the strain gauge 54B (which may be carried upon the circuit substrate) readily contacts the exterior surface 40, with the sensor carrier 80 making upon the difference between a bottom surface of the circuit substrate (or protective casing material 60) and the exterior surface 40. Indeed, it is contemplated that where the strain gauge 54B is located somewhere in the middle of the sensor device (e.g., located somewhere between the two ends of the circuit substrate), a suitable hole 86 can be used or even more than one sensor carrier 80 (or a sensor carrier 80 comprised of two separate parts) may be utilized (e.g., one supporting each end of the sensor device 50 above the exterior surface 40). It is further contemplated that a tangential installation may occur in a configuration whereby the strain gauge 54B is located towards one end of the sensor device (e.g., located towards or at an end of the circuit substrate). In this situation, which may be similar to a cantilever installation, the sensor carrier 80 may be used to support the opposite end of the sensor device 50 above the exterior surface 40. Of course, the sensor carrier 80 can be readily adapted to support the sensor device 50 depending upon the installation configuration.

The fixation side 82 can be removably or preferably non-removably attached via adhesives, mechanical fasteners, etc. Through the use of the intermediate sensor carrier 80, a single sensor device 50B can thereby be applied to various fluid fittings 10 having different geometries simply by changing the sensor carrier 80. Such a configuration provides a highly efficient and cost-effective design. Moreover, the sensor carrier 80 can be used to offset or raise the sensor device 50B from the peripheral surface of the fluid fitting, which can be especially useful when the fitting to be monitored is located in a hard to reach location or would interfere with other nearby objects. In this way, an array of sensor carriers 80 provide multiple mounting options for a single sensor.

The sensor device 50B is then attached to the sensor side 84 of the sensor carrier 80. The sensor device 50B can be provided on a partially flexible or rigid substrate (e.g., a solid conventional circuit board), which can simplify manufacturing and may further increase accuracy of the onboard sensors. The sensor side 84 of the sensor carrier 80 can be flat, curved, or even include a pocket or recess to receive the sensor device.

In a further embodiment, the sensor carrier 80 could provide space for more than one sensor to be attached. For example, the sensor side 84 could provide two or more side-by-side locations for mounting multiple sensors in various configurations (parallel, perpendicular, angled, different heights, etc.). In this manner, the sensor carrier 80 can also act as a guide for consistent installation of the sensor device 50B in the field.

The sensor device 50B could also be encased or encapsulated within a protective casing material 60B that is radio-transparent to the RF signal. The casing material 60B could be non-removable, such as the various types discussed herein, or could even be a removable container with the sensor device 50B secured therein. In one removable example, where the sensor side 84 of the sensor carrier 80 includes a pocket or recess to receive the sensor device 50B, the protective casing material 60B could be a rigid, physical top cover that is secured over the sensor side 84 to close off the pocket or recess. The top cover could include a gasket or other seal to protect the sensor device 50B from the environment. If desired, a removable top cover provides the ability to remove, repair, or replace the sensor device over time.

The wireless RFID sensor could even be embedded or otherwise attached directly into a pocket 90, recess, hole, or other interior space of the coupling body, drive ring, and/or pipe. For example, as shown in FIG. 5, the pocket 90 can be a flat spot ground or otherwise formed into the outer periphery of the coupling body, drive ring, and/or pipe to provide a desired sensor mounting location. Thus, the pocket 90 can provide a relatively flat spot (i.e., flat as compared to the otherwise curved outer periphery) for mounting the sensor device 50C, which can be useful for strain gauges with a partially flexible or non-flexible circuit. It is also contemplated that the pocket, recess, hole, etc. can be useful to indicate where the sensor device 50 should be installed, so that consistent and desired sensor readings are obtained. The pocket could be oriented radially or axially, or even at an oblique angle relative to a central axis of the fluid fitting. It is further contemplated that the pocket 90, recess, hole, etc. could be formed on an end of the coupling body, drive ring, and/or pipe, and could extend axially a distance therein. In this manner, the sensor device could be inserted in an axial manner into the pocket 90, recess, hole, etc. Optionally, a protective casing material 60C could be applied that is radio-transparent to the RF signal of the RFID tag and interrogator, such as the types previously described herein or even a rigid cover plate or the like. Where a cover plate is used, it may act as a filler to return the combined device back to its nominal shape as if there were no pocket 90, recess, hole, etc. (i.e., the exterior of the installed cover plate, in the installed condition, can be generally flush with the periphery of the coupling body, drive ring, and/or pipe). The cover plate can be removable or non-removable via adhesives, mechanical fasteners, clips, etc.

Preferably, the RFID sensor device 50 obtains all of its electrical power for operation via the RF signal from the interrogator. However, the sensor device 50 could be a semi-active or fully active device with an on-board power source 59, such as a coin cell or preferably a flexible printed battery. Such an active device could provide a greater wireless range for communication with the RFID interrogator, an active communications protocol (Bluetooth, WiFi, cellular, acoustic, optical, infrared, etc.), active on-board computer data processing, audible or visual user feedback via lights, displays, or speakers, etc.

The sensor device 50 can be applied at various locations along the longitudinal axis L of the fluid fittings (i.e., body 12, drive ring 14). It is preferable for the sensor device 50 to be located at a region that experiences relatively high stress at the installed condition, or at potential failure points. In many cases, such a location can be found near or in alignment with one of the main seal 30, inboard seal 32, and/or outboard seal 34. For example, as shown in FIG. 3, the physical stress 15 in the material of the drive ring 14, due to its elastic expansion during installation, is relatively high in the position over the location of the main seal 30 because this is a location of high deformation of the sleeve 12b and pipe 16. Thus, the sensor device 50 can be located generally in vertical alignment with the main seal 30, relative to the longitudinal axis of the fitting. More particularly, at least the strain gauge sensor 56 can be located generally in vertical alignment with the main seal 30. Still, the desired position of the sensor device 50 can be determined by research or experience with each particular fluid fitting, pipe, or installation environment.

One method of installing and using the wireless sensor device 50 will now be described. Preferably, the wireless sensor device 50 is applied to the fluid fitting 10 (such as the drive ring 14) at the factory and prior to introduction to the field, using a pressure sensitive adhesive or other adhesives, etc. However, it is contemplated that the sensor device 50 could be provided for installation in the field (for example, by the use of a pressure sensitive adhesive covered by a release layer or an adhesive kit designed for field use). In this manner, the fluid fitting 10 could be manufactured and shipped to the end customer in the conventional manner, and the sensor device 50 applied only at the time of installation. It is further contemplated that the sensor device 50 can be applied to existing, pre-installed fittings in the field. The protective casing material 60 may further be applied over the wireless sensor device 50, either at the factory or in the field. It is contemplated that one type of casing material 60 could be used for all sensor devices 50, or even different types of casing materials 60 could be used for different environments of use (e.g., light duty vs severe/harsh duty environments). Additionally, each sensor device 50 (especially with an RFID chip) preferably includes a unique identifier, such as a unique numerical identifier. The unique identifier can be obtained from the sensor device 50 and associated with a serial number of the fluid fitting 10. This combination can be recorded manually and/or in a computer database, etc. Related information about the properties of the fluid fitting can likewise be recorded, such as the fitting type, material, customer, intended environment, date of manufacture, etc., with the readings occurring either at the manufacturing stage or in the field.

The fluid fitting 10 can then be shipped to the end customer. If the sensor device 50 was not previously installed, it can be applied to the drive ring 14 of the fluid fitting 10 prior to installation. The fluid fitting 10 can then be non-removably installed upon the pipe 16, in the manner described previously herein. Upon full installation of the fluid fitting 10, and/or even during the installation process, the RFID interrogator can be used to obtain a strain reading, from the wireless sensor device 50 of the installed drive ring 14. Thus, the strain reading from the sensor device 50 will be of the drive ring 14 in the installed, elastically-deformed (i.e., expanded) condition. It is also contemplated that the RFID interrogator can obtain strain readings from the wireless sensor device 50 during the in-progress fitting installation. Any or all of the strain reading(s) can be stored to a non-transient memory of one of the RFID memory, or to the interrogator's memory, or to the memory of a network connected computer device.

It is further contemplated that other identification data can be transmitted, recorded or otherwise stored at the time of each sensor reading. For example, a time date stamp for the reading, a unique and application code, ambient environment temperature, temperature of the drive ring 14, other environmental factors, etc., can be sensed, transmitted, and/or stored. Other information can be recorded and/or captured about the fitting itself, such as the type of fitting, the composition of the material, the intended use (e.g., pipe characteristics or field environment), etc. This type of contextual information can be used to provide a more tailored data analysis with respect to the raw data obtained from the sensor device 50.

In addition, it is contemplated that, using the interrogator 100, a strain reading can be taken for the drive ring 14 immediately prior to installation upon the pipe 16 (i.e., prior to application of a compressive force on the fitting). This can be considered a first electrical parameter that provides a baseline reference point strain of the drive ring 14 at the ambient environment where it will be installed. Additionally, the act of applying a strain gauge to an object, such as the drive ring 14, may induce or register some stress upon the strain sensor itself. Thus, an initial strain reading of the drive ring 14 in the non-installed condition can provide a reference point for which to compare the ultimate strain reading at the installed condition. It is further contemplated that the reference point strain reading of the non-installed condition can be used to set a tare or zero point for the strain sensor. This zero point can be done in software, such as in the interrogator or in the integrated circuit of the sensor device 50. For the purpose of future strain readings, it is contemplated that the initial strain sensor reading, or zero point, can be stored or otherwise written into the memory of the integrated circuit of the sensor device 50.

Next, after installation of the drive ring 14 upon the pipe 16 (i.e., after to application of a compressive force on the fitting), the interrogator 100 can be used to take another strain reading. This can be considered a second electrical parameter produced by the sensor device in response to the elastic deformation of the drive ring 14. Next, the first electrical parameter (i.e., pre-install) can be compared against the second electrical parameter (i.e., post-install) to obtain a final value indicative of the quality of the non-leaking attachment between the fluid fitting and the pipe. As will be discussed more fully herein, the final value can be compared against one of a predetermined range, a tolerance band, or a threshold in order to determine the quality of the non-leaking attachment. In this manner, the manufacturer, end-user, and quality control personnel can have a high degree of confidence that the seal is complete (i.e., fully set) and that an acceptable pull-up has occurred.

Thereafter, it is further contemplated that future, periodic strain sensor readings can be taken from the sensor device 50 as desired to provide an ongoing history of the health and condition of the drive ring 14 at the installed condition (to sense changes in stress due to age, usage, fluid in the pipe, mechanical forces upon the attached fitting or pipe, or other factors such as pressure, temperature, vibration, etc.). More broadly, the strain reading of the drive ring 14 can be used to extrapolate the condition of the installed fluid fitting 10 upon the pipe extending over its useful lifetime in the field so that the end-user has a high confidence of understanding how the installed fitting is aging "under the hood." Due to the wireless, non-contact nature of the RFID sensor device 50, such future periodic sensor readings can be obtained in a quick and efficient manner without need to interrupt operation of the pipe 16 in its intended field use, even if the pipe 16 is hidden or otherwise difficult to access.

In addition to obtaining and storing the sensor reading, either the interrogator and/or possibly the sensor device 50 could include computer programming for data analysis and/or comparison. While a raw data reading for the sensed strain of the drive ring 14 is useful, it can be beneficial to provide the end customer with an indication as to whether or not the sensed strain is within a predetermined, acceptable range that indicates that the fluid fitting 10 is installed correctly for its intended purpose, and its health and condition is acceptable. In one example, the interrogator could be programmed with an acceptable range of sensed strain readings, such as a predetermined tolerance band of acceptable readings, and can compare the data from the installed sensor device 50 against the predetermined range, tolerance band, or threshold(s). If the data reading from the sensor device 50 is within the acceptable range, the interrogator can indicate so on a display or other user feedback device. On the contrary, if the data reading from the sensor device 50 indicates that the fluid fitting 10 is not installed correctly, the interrogator can likewise indicate this information to the end-user so that they can perform corrective action.

Along these lines, such comparison and/or data analysis can be done over the lifetime of the installed fluid fitting 10 so that the end customer has a continuing high confidence that the installed fluid fitting is still operating within design parameters. Alternatively, if the periodic, future sensed readings indicate that the fluid fitting 10 is trending out of bounds (e.g., an acceptable reading that is increasingly heading towards or becoming an unacceptable reading), or has exceeded a predetermined threshold (e.g., an unacceptable reading), the end customer can be informed that they should repair or replace the fluid fitting prior to a potential failure. In this manner, the sensor device can be used to determine predictive failure before any actual problems occur in the fluid fitting and/or pipe, so that corrective action can be taken. It is contemplated that the data analysis can take into consideration contextual information, such as the type of fitting, the composition of the material, the intended use (e.g., pipe characteristics or field environment), etc. for determining predetermined acceptable range(s) or threshold (s).

The sensor device 50 could include onboard user feedback (e.g., audible or visual user feedback via lights, displays, or speakers, etc.). In one example, the feedback device 58 could be an LED light that illuminates a particular color for a good installation (e.g., green), and another color for a bad installation (e.g., red). Other colors could be utilized to indicate other conditions, such as a yellow light to indicate that a fitting is at the margins of a predetermined range or is trending towards a certain threshold. Various feedback devices onboard the sensor device 50 may be especially useful in a semi-active or fully active system with an onboard power supply (e.g., flexible battery, coin cell, or the like), although it is possible that a low-power LED light or the like could be sufficiently powered by the RFID interrogator. Where a semi-active or fully active sensor device 50 is utilized, one or more onboard switches 57 can be utilized to enable other functionality, such as activating the sensor device 50 from a low-power sleep mode, obtaining an instant, real-time reading which is stored to memory and/or provides instant feedback from the on-board LED light or the like. In one example, a user could depress the switch 57 to activate the onboard integrated circuit to capture an instant reading from the on-board strain sensor and provide instant feedback via the LED light, without having to utilize an RFID interrogator. In this case, the end-user would not know the raw data reading, but would simply know if the fitting is still within specification or not via the feedback from the LED light. In one example, upon pressing the switch 57, the sensor device 50 can take an instant strain reading and then compare this instant reading to some known threshold or other comparative value or algorithm. If the instant reading is within an acceptable tolerance, the LED light can illuminate a green color; conversely if the instant reading indicates an unacceptable condition, the LED light can illuminate a red color. It is further possible for other colors to be used, such as a yellow color to indicate that the instant reading is still acceptable but close to being unacceptable, or trending towards being unacceptable. However, each reading taken in this manner could also be stored in the onboard memory of the sensor device 50 for later retrieval from an interrogator. Preferably, such stored readings would include reference data, such as a date/time stamp, the reading value, confirmation of whether or not feedback was displayed for the user, etc.

It is further beneficial to have the sensor readings obtained from the sensor device 50 transmitted or otherwise uploaded to a remote central computer server database 120 (e.g., a network-connected or internet-connected computer, sometimes referred to as "in the cloud"). The computer server database 120 could be local to the site of the field installation or the controlling company, local to the manufacturer of the fluid fitting, and/or could be "cloud-based" in that it is maintained at a remote, internet-connected server. Such a "cloud-based" internet-connected server could provide data storage and retrieval capabilities, and/or may further provide computational capabilities to transform, analyze, and/or report upon the cataloged data. Regardless of location, this database can be maintained by the manufacturer of the fluid fitting 10, by a service company that inspects the fittings, and/or by the end user of the fluid fitting 10 for use by the associated quality assurance personnel. Where a non-active (i.e., passive) RFID sensor device 50 is utilized, the interrogator 100 can upload the data in a wired or wireless manner to the central computer server database 120. Of course, with a semi-active or active sensor device 50, such data could be uploaded directly from the fitting 10 (and/or from the interrogator 100). The data obtained from the sensor device 50 can then be catalogued over time to help both of the manufacturer and the end customer track the performance of the fluid fitting for purposes of installation help, maintenance, replacement, warranty claims, etc.

In one example, the initial data from the sensor device 50 and associated fitting 10 can be captured by the manufacturer prior to the product leaving the warehouse, so that the manufacturer has a clear understanding of the state of the fluid fitting 10 and sensor device 50 prior to installation. This data can be uploaded to the computer server database 120 for future use. Various examples of this data can include information about the fluid fitting or sensor, such as a unique identifier of the sensor device, date of manufacture of the fitting, fitting type, material, customer, intended environment, etc. Additionally, if the sensor device 50 is pre-attached to a fluid fitting (such as on the drive ring 14), then an initial strain reading can be taken for the sensor device 50 in the non-installed condition to provide a reference point for which to compare the ultimate strain reading at the installed condition. This could be considered a tare or zero point for the strain sensor, or possibly just one reference point. This data point can be saved into the memory of the sensor device 50 for use by the interrogator, and/or can be saved to the computer server database 120.

Additional field sensor data can then be captured at the time that the fitting is installed upon the pipe (immediately before, during, and/or after), and then periodically thereafter so that the manufacturer maintains a clear understanding of the state of the fluid fitting over its useful lifetime. For example, a strain reading can be taken when the fluid fitting 10 is in the pre-install condition as shown in FIG. 2. This reading can provide a baseline reference point strain of the drive ring 14 at the ambient environment where it will be installed, and can be especially useful as a tare or zero point for the strain sensor (i.e., a non-zero strain reading that can be used as a zero point for comparison with future strain readings). Using the interrogator, this pre-install strain reading taken prior to the installation procedure can be transmitted to and saved into the memory of the sensor device 50, and/or can be saved to the computer server database 120 for future use. If the sensor device 50 if of a type that cannot receive or store data from the interrogator (i.e., a read-only type device), then it can be especially useful to store the pre-install strain reading (i.e., zero point) to the computer server database 120 for future use, using the interrogator 100 to directly or indirectly transmit the data. Optionally, one or more strain readings can be taken during the installation process and the swaging plastic deformation of the body 12 and pipe 16, which can be considered transient readings. These transient readings can be stored (locally or remotely in the cloud) or simply observed during the installation.

Next, a reading is taken immediately following the installation process when the ring 14 is in a fully pulled-up condition and the fitting seal is set against the pipe, which will be considered the post-install strain reading of the fluid fitting upon the pipe. It is also possible that the post-install strain reading is the only reading taken. Using the interrogator 100, this post-install strain reading can be transmitted to and saved into the memory of the sensor device 50, and/or can be saved to the computer server database 120 for future use. Optionally, the post-installation strain reading can be compared against the pre-installation strain reading or against a zero point, in order to determine whether the stress in the drive ring 14 or body 12 is acceptable and indicates a properly installed fitting 10. Thereafter, periodic strain readings can be taken over time and uploaded to the computer server database 120 so that the end user, manufacturer, and other stakeholders maintain a clear understanding of the state of the fluid fitting over its useful lifetime.

In this manner, both the manufacturer and the end-user can keep track of and otherwise understand the performance of the fitting 10 in the field so that all parties involved have a high degree of confidence that the fluid fitting 10 is continuing to perform to its specifications. Alternatively, if the sensed readings indicate that the fitting 10 is trending out of specifications (i.e., still acceptable but moving towards being unacceptable) or is out of specification (i.e., unacceptable), all parties with access to the central computer database can be informed of the status. This can enable the manufacturer to contact the end-user, or the end-user to contact the manufacturer, to arrange maintenance or replacement of the fitting. Data trends can further be understood and identified by observing the information, such as what effect particular fittings, customers, installation techniques, environmental factors, etc. have on the installation, performance, and long term function of the fittings in the field. For example, data indicative of stress cracking, micro stress, or other pre-fail or failure modes can be cataloged and correlated, and then be used as a comparison against other fluid fittings in the field to determine predictive failures and identify potential remedy actions. The computer server database 120 (i.e., the "cloud") can store, analyze, transform, and report on various types of data, including some or all of historical strain readings, comparison of strain readings (current vs. historical), minimums/maximums, data offsets, calculations, etc. With regards to reporting, it is contemplated that the computer server database 120 can be passive, in that the data and/or reports may be compiled but the user ultimately takes action based upon the data, or can be partially or wholly active, in which the computer server database 120 can take further steps such as preemptively report potential problems to the manufacturer, end-user, service company, etc. based upon an analysis of the data input. Such active operation can be partially or fully automatic.

The use of a computer server database 120 is also useful to enable dynamic readings and post-process analysis, based upon changing information. For example, although the term "the interrogator" is used herein for simplicity, it is understood that in actual practice it is unlikely that there will only be a single interrogator device that will take readings from all of the sensor devices in the field. Indeed, it is more likely that each particular sensor device will be interrogated by multiple different interrogators during its active lifetime. Thus, by storing the captured data in a central, remote computer server database 120, it does not matter which particular interrogator is used. Because the data is stored remotely, which may include calibration data stored in associated with the unique identifier of each sensor device, the interrogator may not need any prior information about the particular sensor device being read. For example, prior to taking a strain reading, the interrogator 100 may obtain the specific calibration data for an individual sensor device from the computer server database 120 (if the calibration information is not available from the sensor device itself). The specific calibration data can be obtained by a lookup procedure based upon the unique identifier of the sensor device. Then, when the sensor device transmits a reading (i.e., an electrical parameter) upon interrogation by the interrogator, the transmitted electrical parameter can be corrected by applying the previously retrieved calibration data.

In another example, it is possible that the thresholds, tolerance bands, or predetermined boundaries for acceptable range that indicate that the fluid fitting 10 is installed correctly for its intended purpose may change over time. This may occur for various reasons, including further research and development, a better understanding of lifetime performance of the fluid fittings in different environments, changes in manufacturing, etc. Through the use of a cloud computing environment, the thresholds, tolerance bands, or predetermined boundaries can be easily changed in the computer server database 120 and automatically applied to the data for past, present (real-time), or future strain readings. For example, based upon experience it may be determined that a performance threshold is too low or too high; thus, by changing the threshold in a single computer server database 120, it can be quickly applied across all past, present (real-time), or future strain readings. Similarly, based upon industry or customer demand, unique or different thresholds, tolerance bands, or predetermined boundaries can be applied to only a subset of products (i.e., only certain products of a particular customer or industry), which may change from time to time.

As noted previously herein, the fluid fittings of the instant application and the pipe/tube they are attached to are often used in industrial settings and subjected to harsh environments that can include low or high vibration loads. The mechanical and environmental impact experienced by piping equipment in the presence of continuous or intermittent vibration loads can cause damage to the fluid fittings and/or the connected the pipe/tube that can degrade the performance of the various elements, including the metal-to-metal seal between the fitting and pipe.

In order to understand, measure, and quantify the mechanical joint of the fluid fitting to withstand fatigue stress under various vibration loads over time, vibration testing of the fitting and/or connected pipe/tube can be a valuable tool. With regard to vibration testing, it is understood that vibration is differentiated into two types: steady-state (i.e., repetitive vibration that occurs for a relatively long time period) and dynamic transient vibrations (i.e., vibration that occurs for relatively short time periods and is usually generated by much larger forces, such as a high or low pressure pulse travelling through the fluid). Conventionally, it is known to conduct vibration testing of an existing weld between a fluid fitting and the connected pipe/tube. However, such weld inspection techniques are only intermittent, difficult and time/resource intensive.

The sensor device 50 of the instant application can be further adapted to provide continuous, semi-continuous, or intermitting vibration testing of the fluid fitting 10 and/or the connected the pipe/tube. Because the sensor device 50 is applied to the exterior surface 40 of the drive ring 14 of the fluid fitting 10, and the fluid fitting 10 is mechanically secured to the connected the pipe/tube, the sensor device 50 will be subjected to the same (or substantially the same) vibrations as the connected the pipe/tube. As a result, one or more sensors located on the sensor device 50 can be utilized to sense the vibration experienced by the fitting 10 and connected pipe/tube.

In one example, the vibrations could be sensed indirectly by the sensor device 50 via the single-axis or multi-axis strain gauge sensor 56 measuring the changes in the physical stress in the material of the drive ring. The readings obtained from the strain gauge sensor could be correlated to vibration data, either onboard the sensor device 50 or in the software of the RFID interrogator or other wireless receiving device.

In other examples, the sensor device 50 could include one or more separate sensors 70, such as an accelerometer or vibration sensor (e.g., a piezo vibration sensor, solid state or photodiode, etc.) to sense the vibrations more directly. It is contemplated that the sensor device could only include a sensor for detecting vibration in the pipe. These various separate sensor(s) could be single-axis or multi-axis, as desired. The readings obtained from these separate sensors could directly indicate vibration data, or could be correlated to vibration data, either onboard the sensor device 50 or in the software of the RFID interrogator or other wireless receiving device.

Whether using a strain gauge sensor, accelerometer or vibration sensor, it is further contemplated that an on-board temperature sensor 72 (measuring the fitting temperature, pipe/tube temperature, and/or ambient temperature) may be included to provide context and/or calibration to the vibration data. It is contemplated that the temperature sensor 72 can be onboard the integrated circuit 54 or may be a separate temperature sensor in communication therewith.

With regards to a strain sensor, a common source of error in sensor readings is due to the fact that the sensors may have a temperature coefficient where the output of the transducer is not only a function of the sensed parameter, such as strain, but is also a function of temperature that is experienced by the respective strain sensor. Thus, whenever strain readings are taken, the sensor device 50 can also transmit temperature data together with the strain reading. This temperature measurement can be from the onboard temperature sensor 72 or could be a separate sensor, for example a tethered sensor that is placed adjacent to the strain transducer to measure the temperature very near the transducer, or even a temperature sensor on the interrogator 100 that can report ambient temperature conditions. Preferably, each sensor device 50 is temperature calibrated at the factory prior to installation on the fluid fitting, or even after installation on the fluid fitting but prior to the fluid fitting being installed on a pipe. The calibration data, which may include a temperature coefficient or constant, is preferably written to the on-board memory of the sensor device 50 for later use by the interrogator 100. Additionally, the calibration data (including a temperature coefficient, if available) is also preferably written to the computer server database 120 (i.e., to the cloud) for future use by the interrogator 100 to ensure accurate readings of each individual sensor device 50. This is especially useful where the strain sensor is read-only and cannot store on-board calibration data. It is further contemplated that the interrogator 100 may only act as a "pass through" device that obtains raw data from the sensor device 50 (strain readings, temperature readings, vibration readings, etc.) and transmits this raw data to the computer server database 120 for processing, whereby the calibrations are applied, the data is analyzed and/or transformed into the final strain readings.

It is noted that while the sensor device 50 may include one or more additional sensors as described above, it is further contemplated that the accelerometer/vibration sensor could be embodied in an entirely separate wireless sensor device that is separately applied to the fluid fitting and/or connected pipe/tube. Such a separate wireless sensor device could be substantially similar to the sensor device 50 described above, including any features, mounting options, protection, etc. discussed herein, although it would include the accelerometer and/or vibration sensor in place of the strain sensor. In this manner, the fitting 10 could have two separate sensor devices 50 affixed to it (i.e., a strain sensor and a vibration sensor). Of course, the underlying electronics of such a separate sensor device could be customized to more directly suit the special requirements of the particular sensor used, especially in the case of an implementation using RFID or other wireless transmission systems.

The vibration readings could be obtained manually by an interrogator device, similar to those previously described herein. In one embodiment, if the vibration is sensed by sensors that are part of the sensor device 50, then such sensed data can be transmitted to the interrogator when the strain readings are already being obtained. Alternatively, the interrogator could obtain separate readings for each of the sensed strain and vibration. In yet another alternative, separate interrogator devices could be used to separately obtain sensed strain readings and sensed vibration readings. Such separate readings could be obtained whether the sensor device 50 includes only a strain sensor, or additional accelerometers or vibration sensors. Separate readings could further be obtained if the accelerometer/vibration sensor is embodied in an entirely separate wireless sensor device, and any resultant readings could be stored in the memory of the sensor device, interrogator, or computer server database 120.

However, because vibration occurs fairly constantly in the pipe/tube as a result of fluid flow, especially in an industrial operational setting, it is beneficial to measure the vibration readings on a continuous or semi-continuous basis as opposed to intermittent and periodic readings. In one example, a dedicated interrogator could be positioned relatively close to the location of the sensed vibration readings and can periodically interrogate the sensor device to obtain continuous or semi-continuous vibration readings. The dedicated interrogator could also act as a local power supply for a RFID version of the vibration sensor device. Such a dedicated interrogator is preferably connected to a local network (LAN) or wide-area network (WAN, the internet) for remote control and data collection. The collected data could be automatically recorded and uploaded/stored locally to the RFID sensor device, dedicated interrogator, or in a networked computer server database 120 (i.e., the "cloud"). It is further contemplated that such a dedicated interrogator system can also be utilized for use with the RFID strain sensor to automatically take any of continuous, semi-continuous, intermittent, and/or periodic readings, which can be likewise uploaded/stored locally to the RFID sensor device, dedicated interrogator, or in the networked computer server database 120. If access to the networked computer system is not always available, the periodic sensor readings could be temporarily stored locally in the RFID sensor device or dedicated interrogator until obtained by a user for eventual upload to the computer server database 120.

Preferably, the vibration sensor device, when implemented using RFID, obtains all of its electrical power for operation via the RF signal from the interrogator. However, in order to obtain continuous or semi-continuous vibration sensor readings, without the need of an interrogator nearby, the vibration sensor device could be a semi-active or fully active device with an on-board power source 59, such as a coin cell or preferably a flexible printed battery. Such an active or semi-active device could obtain continuous or semi-continuous readings from the on-board strain sensor, accelerometer, and/or vibration sensor and store the readings in local on-board memory. The stored readings could be periodically transmitted/downloaded to an interrogator when desired by the user. It is further contemplated that a switch (similar to switch 57 described herein) could be provided to take on-demand readings. In other embodiments, the active or semi-active device could obtain continuous or semi-continuous readings of vibration and could only record the readings to memory if the sensed vibration exceeds a predetermined amount (e.g., out-of-spec vibration events). Additional benefits include providing a greater wireless range for communication with the RFID interrogator, an active communications protocol (Bluetooth, WiFi, cellular, etc.), active on-board computer data processing, audible or visual user feedback via lights, displays, or speakers, etc.

The useful vibration data can be captured continuously, semi-continuously, or periodically thereafter so that the manufacturer maintains a clear understanding of the state of the fluid fitting and connected pipe/tube over its useful lifetime. The collected data can be ultimately stored in the computer server database 120, as desired. In this manner, both the manufacturer and the end-user can keep track of and otherwise understand the performance of the fitting 10 in the field so that all parties involved have a high degree of confidence that the fluid fitting 10 is continuing to perform to its specifications. Alternatively, if the sensed readings indicate that the fitting 10 or connected pipe/tube is trending out of specifications or is out of specification as a result of vibration loads, all parties with access to the central computer database can be informed of the status. This can enable the manufacturer to contact the end-user, or the end-user to contact the manufacturer, to arrange maintenance or replacement of the fitting and/or connected pipe/tube.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A fluid fitting for mechanical attachment to a pipe, comprising:
    a coupling body having an inner surface defining a bore for receiving the pipe therein at an end of the coupling body;
    a ring configured to fit over the end of the coupling body for mechanically attaching said coupling body to the pipe;
    a seal portion formed on the inner surface of the coupling body to engage the pipe, wherein when said ring is installed on the end of the coupling body via force, the ring deforms elastically to an expanded condition and applies a compressive force to the seal portion sufficient to cause permanent deformation of the coupling body such that a tooth of the seal portion bites into the pipe to thereby attach the pipe to the coupling body in a non-leaking manner; and
    an electrically operated sensor device fixed to an exterior surface of the ring that produces an electrical parameter in response to physical expansion movement of said ring to which the sensor device is fixed,
    wherein the electrically operated sensor device is positioned on the exterior surface of the ring such that when said ring is installed on the end of the coupling body, the electrically operated sensor device is configured to measure expansion of the exterior surface of said ring that occurs radially away from a longitudinal axis of the fluid fitting.

2. The fluid fitting of claim 1, wherein the electrically operated sensor device comprises a strain gauge that is configured to measure strain in said ring that is caused by said expansion of said ring.

3. The fluid fitting of claim 2, wherein the strain gauge comprises a metal film resistance device.

4. The fluid fitting of claim 1, wherein the physical movement of said ring occurs in response to elastic deformation of the ring.

5. The fluid fitting of claim 1, wherein the electrically operated sensor device is a wireless RFID sensor that is passively powered by an electromagnetic field from an interrogator.

6. The fluid fitting of claim 5, wherein the electrically operated sensor device transmits the electrical parameter in response to a signal from said interrogator, and said interrogator thereafter transmits said electrical parameter to a remote central computer server database.

7. The fluid fitting of claim 1, wherein the electrically operated sensor device comprises a flexible substrate that conforms to a curved surface of said ring to which the sensor device is fixed.

8. The fluid fitting of claim 1, further comprising a radio-transparent protective casing material applied over the electrically operated sensor device to encase and isolate the sensor device from an external environment.

9. The fluid fitting of claim 1, wherein the electrically operated sensor device comprises a microprocessor, a strain gauge sensor, a wireless communication transmitter and an antenna.

10. The fluid fitting of claim 9, wherein the electrically operated sensor device further comprises a temperature sensor.

11. The fluid fitting of claim 1, wherein the electrically operated sensor device comprises one of an accelerometer or vibration sensor to sense vibration of the pipe.

12. The fluid fitting of claim 1, wherein the electrically operated sensor device is positioned on the surface of the ring such that when said ring is installed on the end of the coupling body, the electrically operated sensor device overlaps with the tooth of the seal portion vertically, relative to the longitudinal axis of the fluid fitting.

13. The fluid fitting of claim 1, further comprising a sensor carrier interposed between the electrically operated sensor device and the ring,
    wherein the sensor carrier comprises a fixation side having a geometry that corresponds to an exterior periphery of said ring, and an opposite sensor side that the electrically operated sensor device is connected to.

14. A method of mechanically attaching the fluid fitting of claim 1 to the pipe, the method comprising the steps of:
- inserting the pipe into the end of the coupling body such that the seal portion is positioned adjacent an exterior surface of the pipe;
- installing the ring onto the the coupling body via force so that:
  - the ring deforms elastically to the expanded condition and applies the compressive force to the seal portion sufficient to cause permanent deformation of the coupling body such that the tooth of the seal portion bites into the pipe, thereby attaching the pipe to the coupling body in the non-leaking manner, and
  - the electrically operated sensor device measures expansion of the exterior surface of said ring and produces an electrical parameter indicative of strain caused by the expansion;
- interrogating, using an RF interrogator, the electrically operated sensor device; and
- in response to said interrogating, transmitting, from the electrically operated sensor device, said electrical parameter produced by the electrically operated sensor device.

15. The method of claim 14, further comprising the step of storing the produced electrical parameter in a non-transient memory of one of the electrically operated sensor device, the RF interrogator, or a remote central computer server database.

16. The method of claim 14, further comprising the steps of:
- interrogating, using said RF interrogator, the electrically operated sensor device immediately prior to the step of applying the compressive force to obtain a first electrical parameter;
- interrogating, using said RF interrogator, the electrically operated sensor device immediately after permanent deformation of the coupling body to obtain a second electrical parameter; and
- comparing the first electrical parameter to the second electrical parameter to obtain a final value indicative of a quality of the non-leaking attachment between the fluid fitting and the pipe.

17. The method of claim 16, further comprising the step of comparing the final value against one of a predetermined range, a tolerance band, or a threshold to determine said quality of the non-leaking attachment.

18. The method of claim 14, wherein the electrically operated sensor device comprises a unique identifier, further comprising the steps of:
- storing a calibration data of the electrically operated sensor device, associated with the unique identifier, in a remote central computer server database;
- interrogating, using the RF interrogator, the electrically operated sensor device immediately prior to the step of applying the compressive force to obtain the unique identifier;
- obtaining, using the RF interrogator, the calibration data associated with the unique identifier from the remote central computer server database; and
- correcting the transmitted electrical parameter from the electrically operated sensor device by applying the calibration data.

19. A fluid fitting for mechanical attachment to a pipe, comprising:
- a coupling body having an inner surface defining a bore for receiving the pipe therein at an end of the coupling body;
- a ring configured to fit over the end of the coupling body for mechanically attaching said coupling body to the pipe;
- a seal portion formed on the inner surface of the coupling body to engage the pipe, wherein when said ring is installed on the end of the coupling body via force, the ring deforms elastically and applies a compressive force to the seal portion sufficient to cause permanent deformation of the coupling body such that a tooth of the seal portion bites into the pipe to thereby attach the pipe to the coupling body in a non-leaking manner; and
- an electrically operated sensor device fixed to a surface of the ring that produces an electrical parameter in response to physical movement of said ring to which the sensor device is fixed,
- wherein the electrically operated sensor device is positioned on the surface of the ring such that when said ring is installed on the end of the coupling body, the electrically operated sensor device at least partially overlaps with the tooth of the seal portion vertically, relative to a longitudinal axis of the fluid fitting.

* * * * *